(12) United States Patent
Yu

(10) Patent No.: US 8,585,289 B2
(45) Date of Patent: Nov. 19, 2013

(54) SPINDLE MOTOR

(75) Inventor: Chang Jo Yu, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 69 days.

(21) Appl. No.: 13/317,930

(22) Filed: Nov. 1, 2011

(65) Prior Publication Data

US 2013/0022298 A1  Jan. 24, 2013

(30) Foreign Application Priority Data

Jul. 22, 2011  (KR) ........................ 10-2011-0072918

(51) Int. Cl.
 *F16C 32/06*  (2006.01)

(52) U.S. Cl.
 USPC ............ 384/100; 384/107; 384/110; 384/115

(58) Field of Classification Search
 USPC ................. 384/100, 107, 110, 114, 115, 121; 360/99.07, 99.08
 See application file for complete search history.

(56) References Cited

U.S. PATENT DOCUMENTS

| 8,277,125 | B2 * | 10/2012 | Kimura et al. ................ 384/100 |
| 2003/0039416 | A1 | 2/2003 | Hino |
| 2005/0213858 | A1 * | 9/2005 | You et al. ...................... 384/121 |
| 2007/0058291 | A1 * | 3/2007 | Shirai et al. ................ 360/99.08 |
| 2009/0140587 | A1 | 6/2009 | Popov |
| 2010/0142869 | A1 | 6/2010 | Grantz et al. |
| 2010/0315742 | A1 | 12/2010 | Kimura et al. |

FOREIGN PATENT DOCUMENTS

| JP | 8-163819 | 6/1996 |
| JP | 2001-234926 | 8/2001 |
| JP | 2001-355631 | 12/2001 |
| JP | 2002-181046 | 6/2002 |
| JP | 2006-316921 | 11/2006 |
| JP | 2006-353058 | 12/2006 |
| JP | 2009-136143 | 6/2009 |
| JP | 2010-286071 | 12/2010 |
| JP | 2011-99518 | 5/2011 |
| KR | 2001-0010451 | 2/2001 |
| KR | 2007048543 A * | 5/2007 |
| KR | 10-2010-0064349 | 6/2010 |

OTHER PUBLICATIONS

Korean Office Action issued on Nov. 16, 2012 in corresponding Korean Patent Application No. 10-2011-0072918.
Korean Office Action issued Feb. 27, 2012 in corresponding Korean Patent Application No. 10-2011-0072918.
Japanese Office Action issued Jul. 9, 2013 in the corresponding Japanese Patent Application No. 2011-228300.

* cited by examiner

*Primary Examiner* — Phillip A Johnson

(57) ABSTRACT

There is provided a spindle motor including: a lower thrust member fixedly attached to a base member; a shaft fixedly attached to at least one of the lower thrust member and the base member; a sleeve disposed on an upper portion of the lower thrust member and rotatably installed on the shaft; a rotor hub coupled to the sleeve to thereby rotate together therewith; and an upper thrust member fixedly attached to an upper end portion of the shaft and forming a liquid-vapor interface together therewith, wherein the sleeve has an inclination part formed at an upper end portion thereof so as to form the liquid-vapor interface together with the upper thrust member, the inclination part having an outer diameter larger in an upper portion thereof than in a lower portion thereof.

10 Claims, 5 Drawing Sheets

SPINDLE MOTOR

CROSS-REFERENCE TO RELATED APPLICATIONS

This application claims the priority of Korean Patent Application No. 10-2011-0072918 filed on Jul. 22, 2011, in the Korean Intellectual Property Office, the disclosure of which is incorporated herein by reference.

BACKGROUND OF THE INVENTION

1. Field of the Invention

The present invention relates to a spindle motor, and more particularly, to a shaft fixing type spindle motor in which a shaft is fixedly installed.

2. Description of the Related Art

A shaft fixing type spindle motor, in which a shaft having strong impact resistance is fixed to a hard disk driving device box, is generally mounted in an information recording and reproducing device such as a hard disk driving device for a server or the like.

That is, the shaft is fixedly installed in the spindle motor mounted in the hard disk driving device for a server in order to prevent information recorded in the server from being damaged and being unrecordable/unreadable due to an external impact.

As described above, when the fixed type shaft is installed, two sleeves, two fixed members, two covers for shielding upper and lower portions of the fixed members, and the like, are generally required in order to configure a fluid dynamic bearing assembly filled with lubricating fluid. In other words, a number of components are required in order to configure the fluid dynamic bearing assembly including the fixedly installed shaft. Since a number of components are required in order to configure the fluid dynamic bearing assembly as described above, manufacturing costs may increase.

Meanwhile, since it is demanded that a spindle motor used for an enterprise hard disk driving device has high reliability, maintaining an amount of lubricating fluid filling a fluid dynamic bearing assembly including a fixing type shaft is required.

That is, a lubricating fluid sealing technology capable of suppressing a reduction in an amount of lubricating fluid due to evaporation is in urgent demand.

SUMMARY OF THE INVENTION

An aspect of the present invention provides a spindle motor capable of suppressing a reduction in lubricating fluid filling a bearing clearance.

According to an aspect of the present invention, there is provided a spindle motor including: a lower thrust member fixedly attached to a base member; a shaft fixedly attached to at least one of the lower thrust member and the base member; a sleeve disposed on an upper portion of the lower thrust member and rotatably installed on the shaft; a rotor hub coupled to the sleeve to thereby rotate together with the sleeve; and an upper thrust member fixedly attached to an upper end portion of the shaft and forming a liquid-vapor interface together with the sleeve, wherein the sleeve has an inclination part formed at an upper end portion thereof so as to form the liquid-vapor interface together with the upper thrust member, the inclination part having an outer diameter larger in an upper portion thereof than in a lower portion thereof.

The upper thrust member may include a body having an inner surface bonded to the shaft and a protrusion part extended from the body to thereby form the liquid-vapor interface together with the inclination part.

An inner peripheral surface of the sleeve and an outer peripheral surface of the shaft may be disposed to be spaced apart from each other by a predetermined interval to thereby form a bearing clearance, and the shaft may include a depression groove depressed from the outer peripheral surface thereof to thereby separate lubricating fluid filling the bearing clearance into two parts.

The sleeve may include a communication hole disposed to face the depression groove to thereby communicate between the depression groove and the outside of the sleeve.

The rotor hub may include: a rotor hub body including an insertion part formed therein, the insertion part including the upper thrust member insertedly disposed in an inner portion thereof; a mounting part extended from an edge of the rotor hub body and including a magnet assembly mounted on an inner surface thereof; and an extension part extended from an edge of the mounting part in an outer diameter direction.

The magnet assembly may include a yoke fixedly attached to an inner surface of the mounting part and a magnet installed on an inner peripheral surface of the yoke.

The lower thrust member may include a disk part having an inner surface fixedly attached to the shaft and an outer surface fixedly attached to the base member and an extension part extended upwardly from the disk part.

A lower end portion of an outer peripheral surface of the sleeve may be inclined upwardly in an inner diameter direction so as to form the liquid-vapor interface together with the extension part.

An outer surface of the upper thrust member and an inner surface of the rotor hub disposed to face the outer surface of the upper thrust member may form a clearance of 0.3 mm or less.

The upper thrust member may have a thickness at which an upper surface thereof is disposed on the same plane as an upper surface of the shaft when the upper thrust member is installed on the shaft.

An outer peripheral surface of the upper thrust member and an inner peripheral surface of the rotor hub disposed to face the outer peripheral surface of the upper thrust member may be inclined.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

Further, when it is determined that the detailed description of the known art related to the present invention may obscure the gist of the present invention, a detailed description thereof will therefore be omitted.

Figure 1:
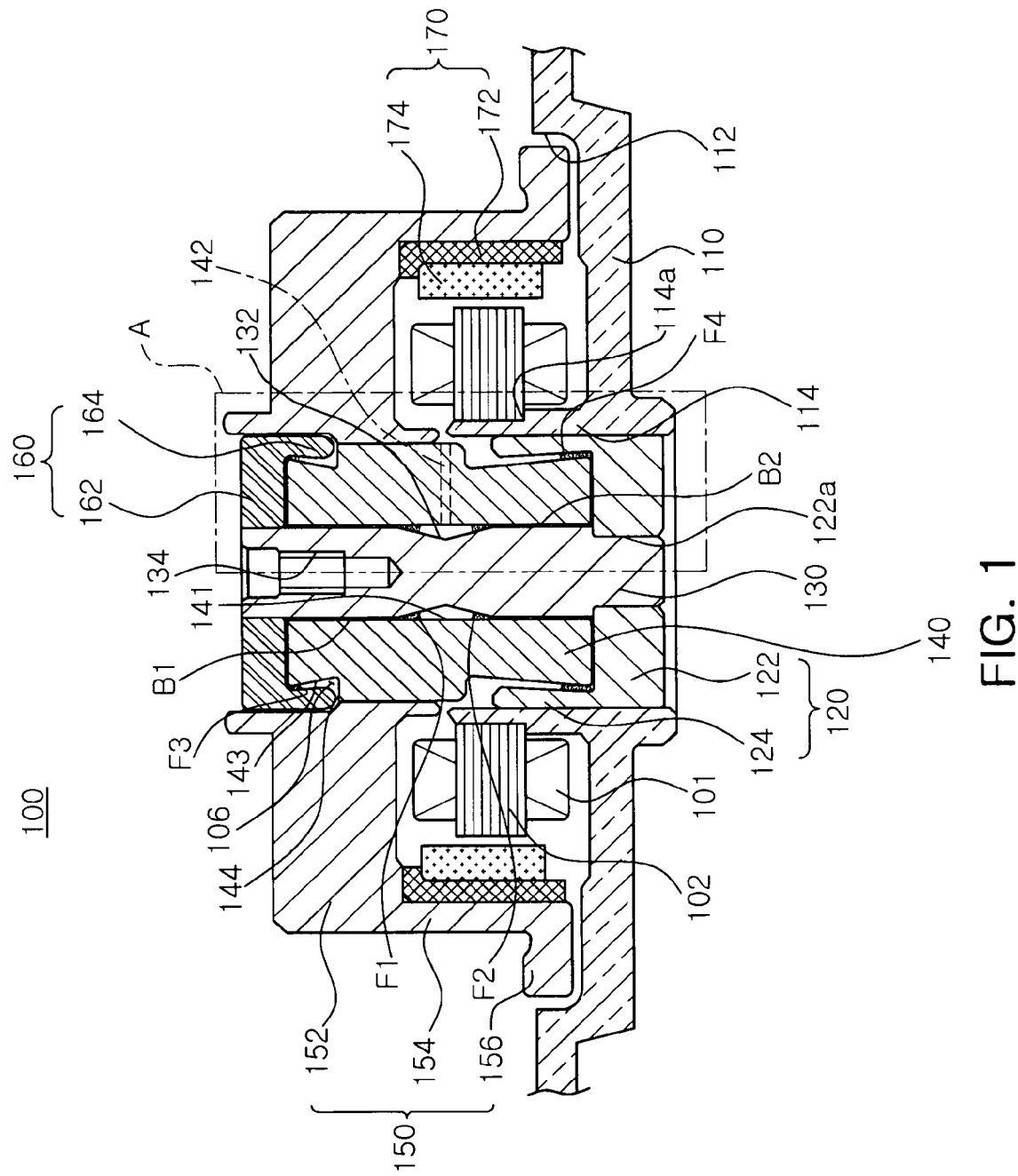
FIG. 1 is a cross-sectional view schematically showing a spindle motor according to an embodiment of the present invention.
Figure 2:
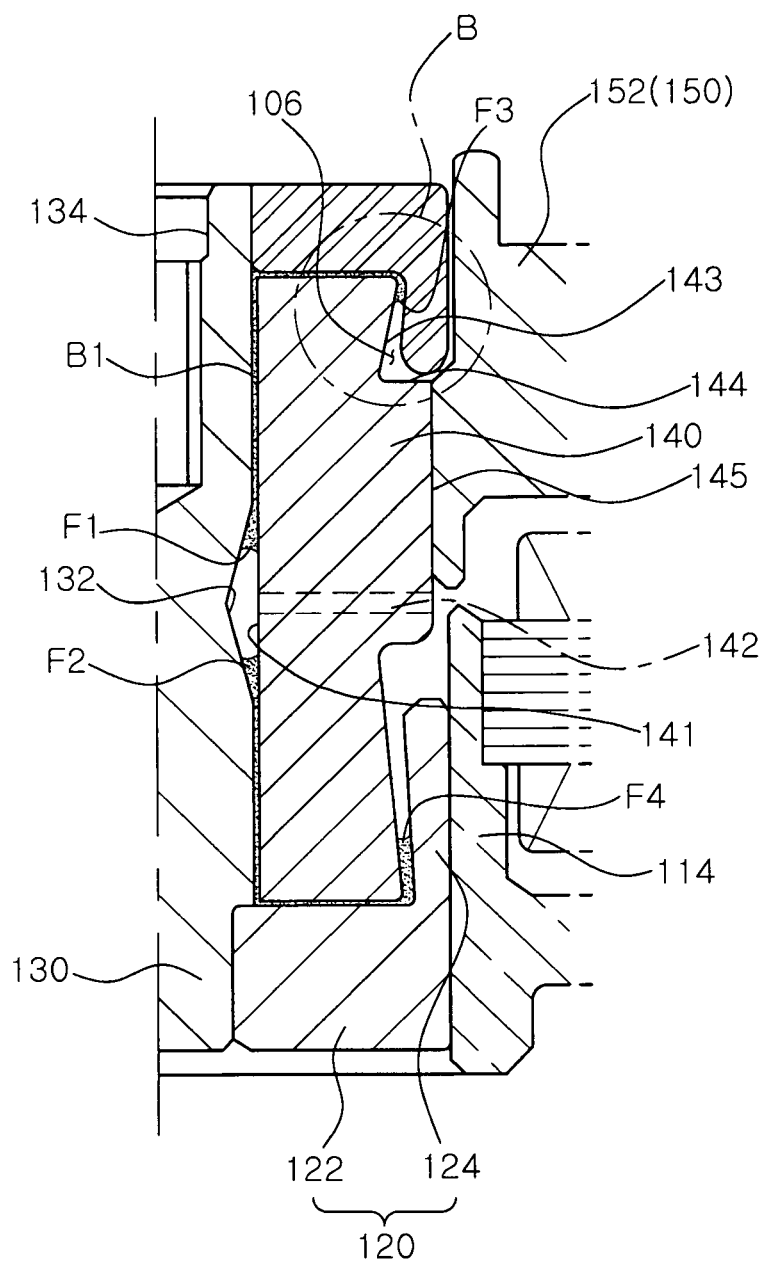
FIG. 2 is an enlarged view of part A of FIG. 1.

FIG. 1 is a cross-sectional view schematically showing a spindle motor according to an embodiment of the present invention, and FIG. 2 is an enlarged view showing part A of FIG. 1.

Referring to FIGS. 1 and 2, a spindle motor 100 according to an embodiment of the present invention may include a base member 110, a lower thrust member 120, a shaft 130, a sleeve 140, a rotor hub 150, and an upper thrust member 160.

The base member 110 may include a mounting groove 112 so as to form a predetermined space together with the rotor hub 150. In addition, the base member 110 may include a coupling part 114 formed to extend upwardly therefrom in an axial direction and having a stator core 102 installed on an outer peripheral surface thereof.

In addition, the coupling part 114 may include a seat surface 114a provided on the outer peripheral surface thereof so that the stator core 102 may be seated and installed thereon. Further, the stator core 102 seated on the coupling part 114 may be disposed over the mounting groove 112 of the base member 110 described above.

The lower thrust member 120 may be fixedly mounted to the base member 110. That is, the lower thrust member 120 is insertedly installed in the coupling part 114. More specifically, the lower thrust member 120 may be installed so that an outer peripheral surface thereof is bonded to an inner peripheral surface of the coupling part 114.

Meanwhile, the lower thrust member 120 may include a disk part 122 having an inner surface fixedly attached to the shaft 130 and an outer surface fixedly attached to the base member 110 and an extension part 124 extended upwardly from the disk part 122 in an axial direction.

That is, the lower thrust member 120 may have a cup shape having a hollow part and may have an 'L' shaped cross section.

In addition, the disk part 122 may be provided with an installation hole 122a for installing the shaft 130, and the shaft 130 may be insertedly mounted in the installation hole 122a.

Here, terms with respect to directions will be defined. As viewed in FIG. 1, an axial direction refers to a vertical direction, that is, a direction from a lower portion of the shaft 130 toward an upper portion thereof and a direction from the upper portion of the shaft 130 toward the lower portion thereof, a radial direction refers to a horizontal direction, that is, a direction from the shaft 130 toward an outer peripheral surface of the rotor hub 150 or from the outer peripheral surface of the rotor hub 150 toward the shaft 130, and a circumferential direction refers to a rotation direction along an outer peripheral surface of the rotor hub 150.

In addition, the lower thrust member 120 is included, together with the base member 110, in a fixed member, that is, a stator.

Meanwhile, the outer surface of the lower thrust member 120 may be bonded to an inner surface of the base member 110 by an adhesive and/or welding. In other words, the outer surface of the lower thrust member 120 may be fixedly bonded to an inner surface of the coupling part 114 of the base member 110.

In addition, a thrust dynamic pressure groove (not shown) for generating thrust fluid dynamic pressure may be formed in at least one of an upper surface of the lower thrust member 120 and a lower surface of the sleeve 140.

Further, the lower thrust member 120 may also serve as a sealing member for preventing lubricating fluid from being leaked.

The shaft 130 may be fixedly attached to at least one of the base member 110 and the lower thrust member 120. That is, the shaft 130 may be installed so that a lower end portion thereof is inserted into the installation hole 122a formed in the disk part 122 of the lower thrust member 120.

In addition, the lower end portion of the shaft 130 may be bonded to an inner surface of the disk part 122 by an adhesive and/or welding. Therefore, the shaft 130 may be fixed.

Further, although the present embodiment describes a case in which the shaft 130 is fixedly attached to the lower thrust member 120, the present invention is not limited thereto. That is, the shaft 130 may also be fixedly attached to the base member 110.

Meanwhile, the shaft 130 may be also included, together with the lower thrust member 120 and the base member 110, in the fixed member, that is, the stator.

In addition, the shaft 130 may include a depression groove 132 depressed from an outer peripheral surface thereof to thereby separate lubricating fluid filling bearing clearances B1 and B2 into two parts. The depression groove 132 may have a 'V' shaped cross section.

The depression groove 132 may serve to form a liquid-vapor interface (that is, an interface between the lubricating fluid and air) together with an inner surface of the sleeve 140. A detailed description thereof will be provided below.

Meanwhile, the shaft 130 may include a coupling unit, for example, a screw part 134 having a screw screwed thereto, formed in an upper surface thereof so that a cover member (not shown) may be fixedly installed thereon.

The sleeve 140 may be rotatably installed on the shaft 130. To this end, the sleeve 140 may include a through hole 141 into which the shaft is inserted. Meanwhile, in the case in which the sleeve 140 is installed adjacent to the shaft 130, an inner peripheral surface of the sleeve 140 and the outer peripheral surface of the shaft 130 are disposed to be spaced apart from each other by a predetermined interval to thereby form the bearing clearances B1 and B2 therebetween.

In addition, the lubricating fluid fills the bearing clearances B1 and B2.

Here, describing the bearing clearances B1 and B2 in more detail, the bearing clearances B1 and B2 may be configured of an upper bearing clearance B1 and a lower bearing clearance B2. In addition, the upper bearing clearance B1 may refer to a space formed by an upper end portion of the shaft 130 and an upper end portion of the sleeve 140 and a space formed by the upper end portion of the sleeve 140 and the upper thrust member 160.

Further, the lower bearing clearance B2 indicates a space formed by a lower end portion of the shaft 130 and a lower end portion of the sleeve 140 and a space formed by the lower end portion of the sleeve 140 and the lower thrust member 120.

Meanwhile, here, describing the depression groove 132 formed in the shaft 130, the depression groove 132 may serve to form an interface between the lubricating fluid filling each of the above-mentioned bearing clearances B1 and B2, that is, the upper bearing clearance B1 and the lower bearing clearance B2 and air.

That is, an interface between the lubricating fluid filling the upper bearing clearance B1 and air, a first liquid-vapor interface F1, may be formed at an upper portion of the depression groove 132. In addition, interface between the lubricating fluid filling the lower bearing clearance B2 and air, that is, a second liquid-vapor interface F2 may be formed at an lower portion of the depression groove 132.

The depression groove 132 may be formed to have a 'V' shape so that the first and second liquid-vapor interfaces F1 and F2 may be formed as described above. That is, the depression groove 132 may have the 'V' shape so that the first and second liquid-vapor interfaces F1 and F2 may be formed by a capillary phenomenon.

In addition, the sleeve 140 may include a communication hole 142 disposed to face the depression groove 132 to thereby communicate between the depression groove 132 and the outside of the sleeve 140. That is, the communication hole 142 for allowing pressure of the depression groove 132 to be equalized with that of the outside of the sleeve 140 may be formed in the sleeve 140 so that the first and second liquid-vapor interfaces F1 and F2 as described above may be formed.

Meanwhile, the sleeve 140 may have an inclination part 143 formed at an upper end portion thereof so as to form a liquid-vapor interface together with the upper thrust member 160, wherein the inclination part 143 has an outer diameter larger in an upper portion thereof than in a lower portion thereof.

In other words, the inclination part 143 having an outer diameter larger in the upper portion thereof than in the lower portion thereof may be formed at the upper end portion of the sleeve 140 so that a third liquid-vapor interface F3 may be formed in a space between an outer peripheral surface of the sleeve 140 and an inner peripheral surface of the upper thrust member 160.

Therefore, the lubricating fluid filling the upper bearing clearance B1 may form the first and third liquid-vapor interfaces F1 and F3.

Meanwhile, the sleeve 140 may include a stepped surface 144 formed at the upper end portion thereof, wherein the stepped surface 144 is stepped with respect to an upper surface of the sleeve 140 to thereby form a sealing groove 106. A detailed description of the stepped surface 144 will be provided below.

In addition, the sleeve 140 may include the rotor hub 150 bonded to the outer peripheral surface thereof. That is, a lower portion of the stepped surface 144 may have a shape corresponding to that of an inner surface of the rotor hub 150, such that the rotor hub 150 may be fixedly installed thereon. That is, the sleeve 140 may include a bonding surface 145 formed on the outer peripheral surface thereof.

Meanwhile, a lower end portion of the outer peripheral surface of the sleeve 140 may be inclined upwardly in an inner diameter direction so as to form a liquid-vapor interface together with the extension part 124 of the lower thrust member 120.

That is, the lower end portion of the sleeve 140 may be inclined upwardly in the inner diameter direction so that a fourth liquid-vapor interface F4 may be formed in a space between the outer peripheral surface of the sleeve 140 and the extension part 124 of the lower thrust member 120.

As described above, since the fourth liquid-vapor interface F4 is formed in the space between the lower end portion of the sleeve 140 and the extension part 124, the lubricating fluid filling the lower bearing clearance B2 forms the second and fourth liquid-vapor interfaces F2 and F4.

Figure 3:
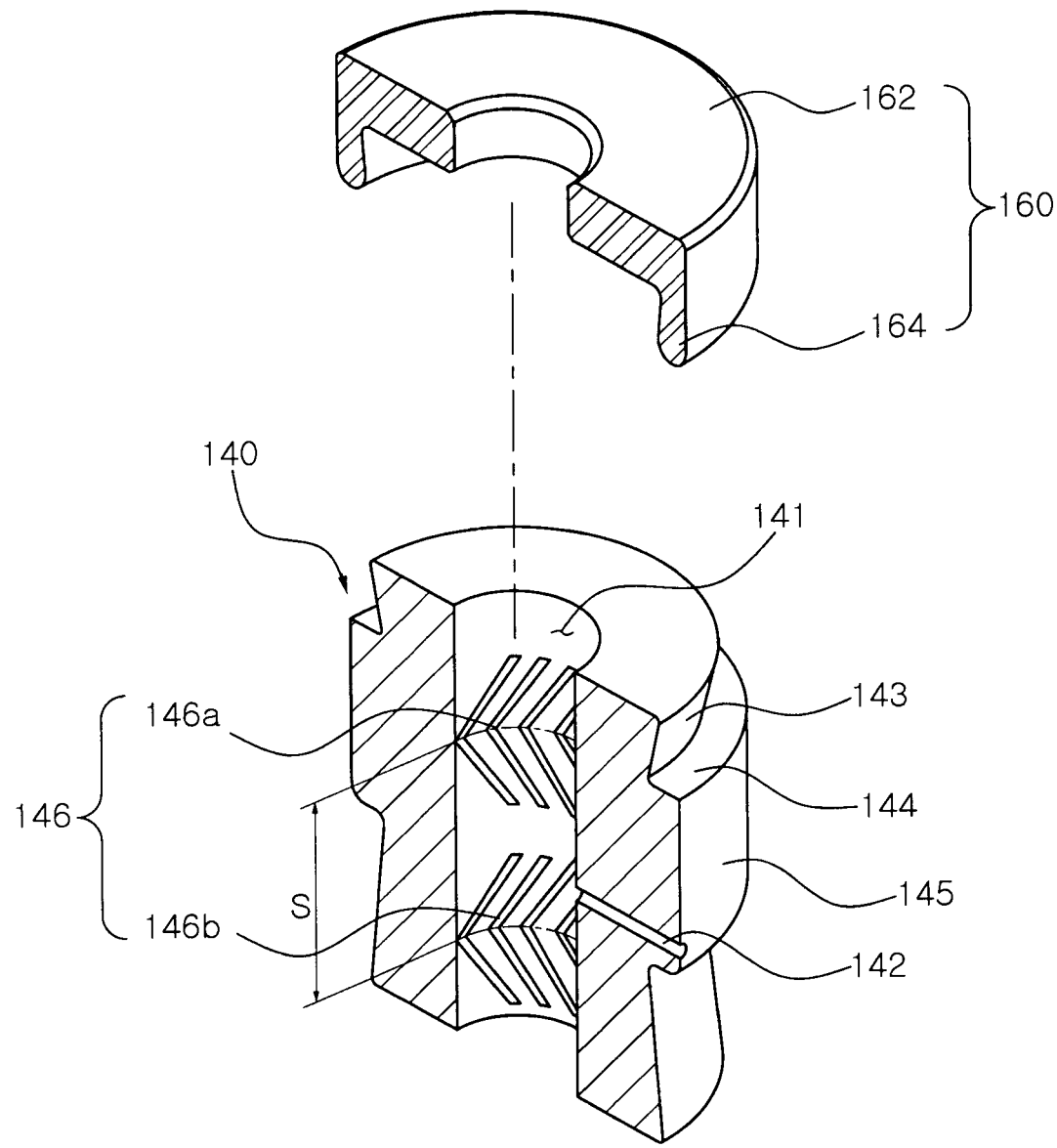
FIG. 3 is a partially cut-away exploded perspective view showing a sleeve and an upper thrust member according to an embodiment of the present invention.

In addition, the sleeve 140 may include a dynamic pressure groove 146 (See FIG. 3) formed in the inner surface thereof, wherein the dynamic pressure groove 146 generates fluid dynamic pressure through the lubricating fluid filling the bearing clearance B1 and B2 at the time of rotation of the sleeve 140. That is, the dynamic pressure groove 146 includes upper and lower dynamic grooves 146a and 146b.

However, the dynamic pressure groove 146 is not limited to being formed in the inner surface of the sleeve 140 but may also be formed in the outer peripheral surface of the shaft 130.

The rotor hub 150 is coupled to the sleeve 140 to thereby rotate together therewith.

The rotor hub 150 may include a rotor hub body 152 including an insertion part 152a formed therein, the insertion part 152a including the upper thrust member 160 insertedly disposed in an inner portion thereof, a mounting part 154 extended from an edge of the rotor hub body 152 and including a magnet assembly 170 mounted on an inner surface thereof, and an extension part 156 extended from an edge of the mounting part 154 in an outer diameter direction.

Meanwhile, a lower end portion of an inner surface of the rotor hub body 152 may be bonded to an outer surface of the sleeve 140. That is, the lower end portion of the inner surface of the rotor hub body 152 may be bonded to the bonding surface 145 of the sleeve 140 by an adhesive and/or welding.

Therefore, the sleeve 140 may rotate together with the rotor hub 150 at the time of rotation of the rotor hub 150.

In addition, the mounting part 154 may be extended downwardly from the rotor hub body 152 in the axial direction. Further, the mounting part 154 may include the magnet assembly 170 fixedly attached to the inner surface thereof.

Meanwhile, the magnet assembly 170 may include a yoke 172 fixedly attached to the inner surface of the mounting part 154 and a magnet 174 installed on an inner peripheral surface of the yoke 172.

The yoke 172 serves to direct a magnetic field from the magnet 174 toward the stator core 102 to thereby increase magnetic flux density. Meanwhile, the yoke 172 may have a circular ring shape or a shape in which one end portion thereof is bent so as to increase the magnetic flux density by the magnetic field generated from the magnet 174.

The magnet 174 may have an annular ring shape and be a permanent magnet generating a magnetic field having a predetermined strength by alternately magnetizing an N pole and an S pole in a circumferential direction.

Meanwhile, the magnet 174 is disposed to face a front end of the stator core 102 having a coil 101 wound therearound and generates driving force by electromagnetic interaction with the stator core 102 having the coil 101 wound therearound so that the rotor hub 150 may rotate.

That is, when power is supplied to the coil 101, the driving force rotating the rotor hub 150 is generated by the electromagnetic interaction between the stator core 102 having the coil 101 wound theraround and the magnet 174 disposed to face the stator core 102, such that the rotor hub 150 may rotate together with the sleeve 140.

The upper thrust member 160 may be fixedly attached to the upper end portion of the shaft 130 and may form the liquid-vapor interface together with the sleeve 140.

Meanwhile, the upper thrust member 160 may include a body 162 having an inner surface bonded to the shaft 130 and a protrusion part 164 extended from the body 162 to thereby form the liquid-vapor interface together with the inclination part 143.

The protrusion part 164 may be extended downwardly from the body 162 in the axial direction and have an inner surface disposed to face the inclination part 143.

In addition, the protrusion part 164 may be extended from the body 162 so as to be parallel to the shaft 130.

Further, the upper thrust member 160 may be inserted/disposed in a space formed by the upper end portion of the outer peripheral surface of the shaft 130, the outer surface of the sleeve 140, and the inner surface of the rotor hub 150.

In addition, the upper thrust member 160, which also is a fixed member fixedly installed together with the base member 110, the lower thrust member 120, and the shaft 130, is a member configuring the stator.

Figure 4:
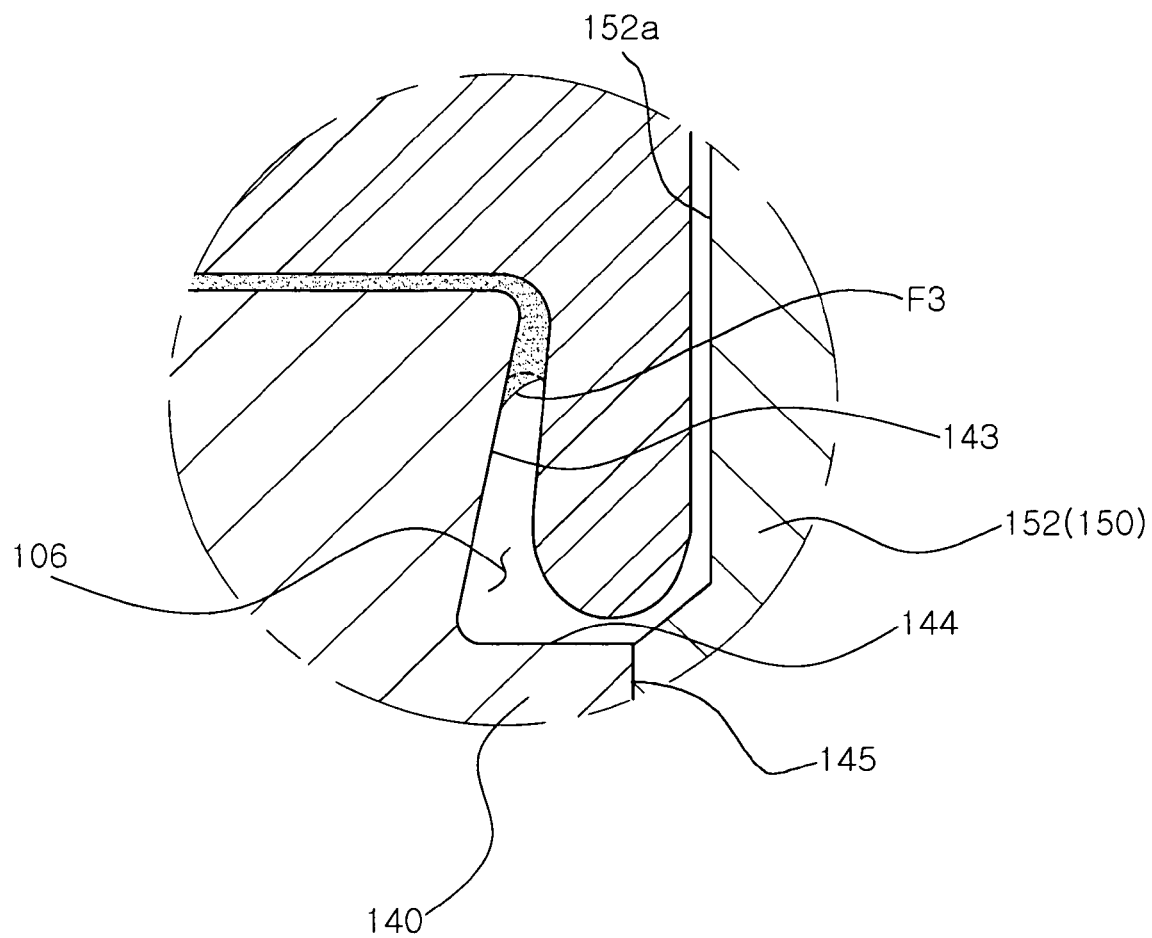
FIG. 4 is a view describing an operation of a spindle motor according to an embodiment of the present invention.

Meanwhile, since the upper thrust member 160 is fixedly attached to the shaft 130 and the sleeve 140 rotates together with the rotor hub 150, when the sleeve 140 rotates, the third liquid-vapor interface F3 formed in the space between the inclination part 143 of the sleeve 140 and the protrusion part 164 may be inclined toward the inclination part 143 of the sleeve 140 due to the rotation of the sleeve 140 as shown in FIG. 4.

Therefore, scattering of the lubricating fluid may be reduced by centrifugal force.

In addition, the inclination part 143, the stepped surface 144, and the inner surface of the rotor hub 150 may form the sealing groove 106, and the third liquid-vapor interface F3 formed in the space between the upper thrust member 160 and the inclination part 143 of the sleeve 140 may be disposed to face the stepped surface 144.

Therefore, when an external impact is applied, a phenomenon in which the lubricating fluid leaked from the third liquid-vapor interface F3 is scattered to the outside may be reduced.

In addition, an outer peripheral surface of the upper thrust member 160 and the inner surface of the rotor hub 150 disposed to face the outer peripheral surface of the upper thrust member 160 may form a labyrinth seal. That is, an outer surface of the upper thrust member 160 and the inner surface of the rotor hub body 152 may be disposed to be spaced apart from each other by a predetermined interval and may form the labyrinth seal so as to suppress a flow of air containing evaporated lubricating fluid to the outside.

Therefore, the flow of air containing the evaporated lubricating fluid to the outside is suppressed, whereby a reduction in the lubricating fluid may be suppressed.

In addition, the outer peripheral surface of the upper thrust member 160 and the inner surface of the rotor hub body 152 may form a clearance of 0.3 mm or less.

Meanwhile, a thrust dynamic pressure groove (not shown) for generating thrust dynamic pressure may be formed in at least one of a lower surface of the upper thrust member 160 and the upper surface of the sleeve 140 disposed to face the lower surface of the upper thrust member 160.

In addition, the upper thrust member 160 may also serve as a sealing member preventing the lubricating fluid filling the upper bearing clearance B1 from being leaked upwardly.

Further, the upper thrust member 160 may have a thickness at which an upper surface thereof may be disposed on the same plane as the upper surface of the shaft 130 when the upper thrust member 160 is installed on the shaft 130.

As described above, the clearance between the upper thrust member 160 and the rotor hub 150 may be formed to have a relatively narrow space to suppress the flow of air containing the evaporated lubricating fluid to the outside, whereby the reduction in the lubricating fluid filling the upper bearing clearance B1 may be suppressed.

In addition, the spindle motor 100 according to the embodiment of the present invention does not need to include a separate sealing member for preventing leakage of the lubricating fluid, such that a bearing span length may increase. Therefore, rotational characteristics may be improved.

Here, the bearing span length S (See FIG. 3) indicates a distance between an area in which relatively maximum dynamic pressure is generated when the lubricating fluid is pumped by an upper dynamic pressure groove 124*a* and an area in which relatively maximum dynamic pressure is generated when the lubricating fluid is pumped by a lower dynamic pressure groove 124*b*.

That is, the spindle motor 100 according to the embodiment of the present invention need not include a separate sealing member, such that a portion at which the separate sealing member is installed is reduced, whereby a length of the sleeve 140 may increase. Therefore, the bearing span length S may also increase.

In addition, since the spindle motor 100 according to the embodiment of the present invention need not include a separate sealing member, manufacturing costs and manufacturing yield may be improved.

Meanwhile, the sleeve 140, among the rotating member (the sleeve) and a fixed member (that is, the upper and lower thrust members) that form the liquid-vapor interfaces, that is, the third and fourth liquid-vapor interfaces F3 and F4, is disposed inside the fixed member in a radial direction, whereby scattering of the lubricating fluid may be reduced by centrifugal force.

Hereinafter, a spindle motor according to another embodiment of the present invention will be described with reference to the accompanying drawings. However, a detailed description of components the same as the above-mentioned components will be omitted and replaced by the above-mentioned description.

Figure 5:
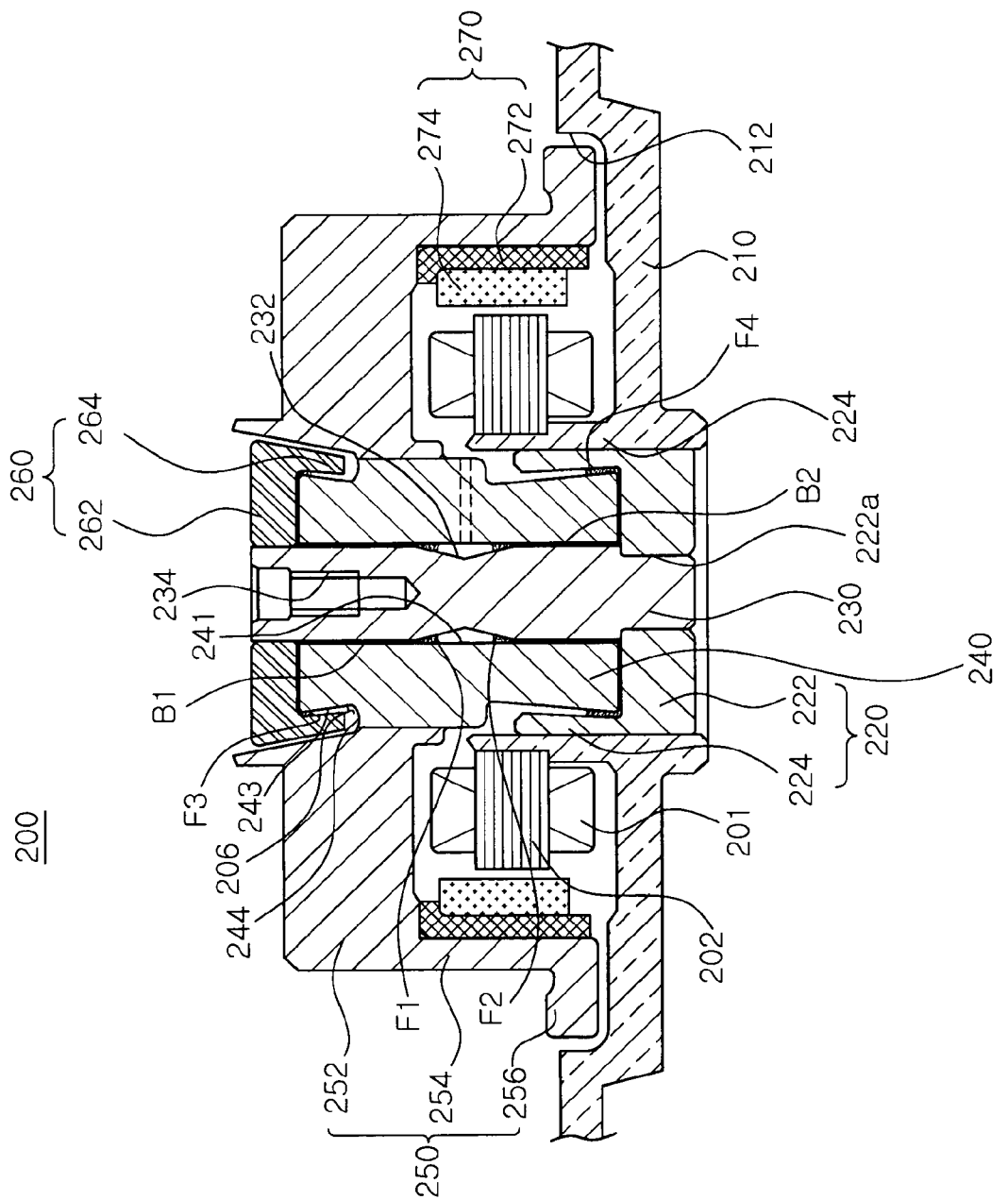
FIG. 5 is a cross-sectional view schematically showing a spindle motor according to another embodiment of the present invention.

FIG. 5 is a cross-sectional view schematically showing a spindle motor according to another embodiment of the present invention.

Referring to FIG. 5, a spindle motor 200 according to another embodiment of the present invention may include a base member 210, a lower thrust member 220, a shaft 230, a sleeve 240, a rotor hub 250, and an upper thrust member 260.

Meanwhile, the base member 210, the lower thrust member 220, the shaft 230, and the sleeve 240 included in a spindle motor 200 according to another embodiment of the present invention have the same configurations as those of the base member 110, the lower thrust member 120, the shaft 130, and the sleeve 140 included in the spindle motor 100 according to the embodiment of the present invention. Therefore, a detailed description thereof will be omitted and be replaced by the above-mentioned description.

In addition, configurations of the rotor hub 250 and the upper thrust member 260 except for configurations to be described below are same as those of the rotor hub 150 and the upper thrust member 160 included in the spindle motor 100 according to the embodiment of the present invention described above. Therefore, a detailed description of the same configurations will be omitted.

Further, the rotor hub 250 may include a rotor hub body 252 including an insertion part 252*a* formed therein, the insertion part 252*a* including the upper thrust member 260 disposed in an inner portion thereof; a mounting part 254 extended from an edge of the rotor hub body 252 and including a magnet assembly 270 mounted on an inner surface thereof; and an extension part 256 extended from an edge of the mounting part 254 in an outer diameter direction.

In addition, an upper end portion of an inner surface of the rotor hub body 252 may be inclined downwardly in an inner diameter direction. Further, an outer surface of the upper thrust member 260 may also be inclined so as to correspond to the upper end portion of the inner surface of the rotor hub body 252.

Therefore, a flow path of air containing evaporated lubricating fluid increases, such that the flow of air containing the evaporated lubricating fluid is further suppressed, whereby reduction in filled lubricating fluid may be further suppressed.

Meanwhile, the spindle motor 200 according to another embodiment of the present invention may also implement the same effects as the effects implemented by the spindle motor 100 according to the embodiment of the present invention. A detailed description thereof will therefore be omitted.

As set forth above, according to the embodiments of the present invention, a clearance between the upper thrust member and the rotor hub is formed to have a relatively narrow space to suppress flow of air containing evaporated lubricating fluid to the outside, whereby reduction in the lubricating fluid filling a bearing clearance may be suppressed.

In addition, the spindle motor according to the embodiment of the present invention does not need to include a separate sealing member for preventing leakage of the lubricating fluid, such that a bearing span length may increase. Therefore, rotational characteristics may be improved.

Further, since the spindle motor according to the embodiment of the present invention need not include a separate sealing member, manufacturing costs and manufacturing yield may be improved.

Furthermore, fixed members, that is, upper and lower thrust members, among a rotating member and the fixed member, which form a liquid-vapor interface, may be disposed outside a sleeve which is the rotating member, in a radial direction, whereby scattering of the lubricating fluid due to centrifugal force may be reduced.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
   a lower thrust member fixedly attached to a base member;
   a shaft fixedly attached to at least one of the lower thrust member and the base member;
   a sleeve disposed on an upper portion of the lower thrust member and rotatably installed on the shaft;
   a rotor hub coupled to the sleeve to thereby rotate together with the sleeve; and
   an upper thrust member fixedly attached to an upper end portion of the shaft and forming a liquid-vapor interface together with the sleeve,
   the sleeve having an inclination part formed at an upper end portion thereof so as to form the liquid-vapor interface together with the upper thrust member, the inclination part having an outer diameter larger in an upper portion thereof than in a lower portion thereof, and
   an outer peripheral surface of the upper thrust member and an inner peripheral surface of the rotor hub disposed to face the outer peripheral surface of the upper thrust member are inclined.

2. The spindle motor of claim 1, wherein the upper thrust member includes a body having an inner surface bonded to the shaft and a protrusion part extended from the body to thereby form the liquid-vapor interface together with the inclination part.

3. The spindle motor of claim 1, wherein an inner peripheral surface of the sleeve and an outer peripheral surface of the shaft are disposed to be spaced apart from each other by a predetermined interval to thereby form a bearing clearance, and
   the shaft includes a depression groove depressed from the outer peripheral surface thereof to thereby separate lubricating fluid filling the bearing clearance into two parts.

4. The spindle motor of claim 3, wherein the sleeve includes a communication hole disposed to face the depression groove to thereby communicate between the depression groove and the outside of the sleeve.

5. The spindle motor of claim 1, wherein the rotor hub includes:
   a rotor hub body including an insertion part formed therein, the insertion part including the upper thrust member insertedly disposed in an inner portion thereof;
   a mounting part extended from an edge of the rotor hub body and including a magnet assembly mounted on an inner surface thereof; and
   an extension part extended from an edge of the mounting part in an outer diameter direction.

6. The spindle motor of claim 5, wherein the magnet assembly includes a yoke fixedly attached to an inner surface of the mounting part and a magnet installed on an inner peripheral surface of the yoke.

7. The spindle motor of claim 1, wherein the lower thrust member includes a disk part having an inner surface fixedly attached to the shaft and an outer surface fixedly attached to the base member and an extension part extended upwardly from the disk part.

8. The spindle motor of claim 7, wherein a lower end portion of an outer peripheral surface of the sleeve is inclined upwardly in an inner diameter direction so as to form the liquid-vapor interface together with the extension part.

9. The spindle motor of claim 1, wherein an outer surface of the upper thrust member and an inner surface of the rotor hub disposed to face the outer surface of the upper thrust member form a clearance of 0.3 mm or less.

10. The spindle motor of claim 1, wherein the upper thrust member has a thickness at which an upper surface thereof is disposed on the same plane as an upper surface of the shaft when the upper thrust member is installed on the shaft.

* * * * *